Patented Jan. 16, 1934

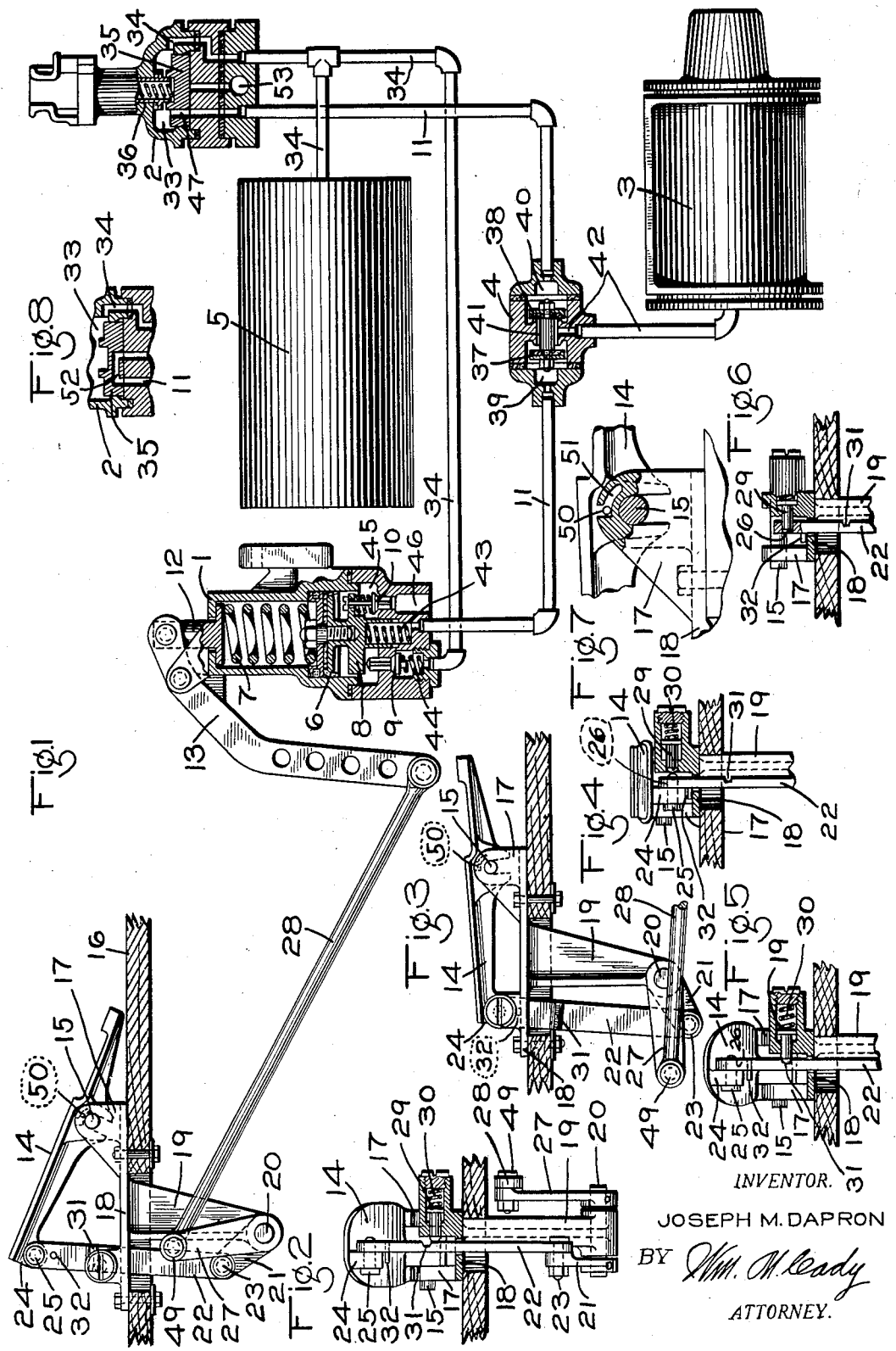

1,943,586

UNITED STATES PATENT OFFICE 1,943,586

PEDAL LOCKING DEVICE

Joseph M. Dapron, St. Louis, Mo., assignor to The Westinghouse Air Brake Company, Wilmerding, Pa., a corporation of Pennsylvania Application August 15, 1930. Serial No. 475,517

10 Claims. (Cl. 74—81)

This invention relates to fluid pressure brake equipments preferably of the type in which a self lapping brake valve device is employed for controlling the brakes and relates more particularly to the means for controlling the operation of such equipments.

An object of my invention is to provide an improved foot controlled mechanism for controlling the operation of a fluid pressure brake equipment of the above type.

Another object of my invention is to provide a foot controlled brake valve controlling mechanism having a foot pedal which is removable in a predetermined brake applying position, preferably full service position, and embodying means whereby the brake valve device and the mechanism, when operated to said brake applying position, are maintained in such position until moved therefrom through the medium of the foot pedal, and a further object of the invention is to provide means operative automatically upon the removal of the foot pedal for positively locking the mechanism and thereby the brake valve device in said predetermined brake applying position.

When a vehicle has been brought to a stop it is customary to maintain the brakes lightly applied by some low brake cylinder pressure, such as, for instance, 15 or 20 pounds, for preventing the vehicle from being accidentally set in motion, and a further object of my invention is to provide a fluid pressure brake equipment with a foot controlled mechanism which, when operated to a position to insure an application of the brakes with sufficient force to hold the vehicle stationary, will be maintained in such position until moved therefrom by foot pressure exerted by the operator, thus permitting the operator to remove his foot from the mechanism without effecting a full release of the brakes.

A still further object of my invention is to provide a fluid pressure brake equipment having a self lapping brake valve device controlled from the front end of a vehicle for normally controlling the brakes and also having an ordinary non-automatic brake valve device at the rear end of the vehicle for controlling the brakes when backing the vehicle.

Other objects and advantages will appear in the following more detailed description of the invention.

In the accompanying drawing; Fig. 1 is a diagrammatic view, partly in section and partly in side elevation, of a fluid pressure brake equipment embodying my invention, the equipment being shown in full release position; Fig. 2 is an end elevational view of a portion of the control mechanism in full release position, a portion of the mechanism being shown in section; Fig. 3 is a side elevational view of a portion of the control mechanism in full service position; Fig. 4 is a fragmentary end elevational view of the same; Fig. 5 is a fragmentary end elevational view of the control mechanism in an intermediate brake applying position; Fig. 6 is a fragmentary end elevational view of the control mechanism in full service position and with the foot pedal removed; Fig. 7 is an enlarged side elevational view of a portion of the control mechanism, a portion of the mechanism being shown in section to more clearly illustrate the construction which provides for the removal of the foot pedal; and Fig. 8 is a diagrammatic sectional view of a portion of the vehicle brake valve device at the rear end of the vehicle showing the brake valve device in brake releasing position.

The fluid pressure brake equipment shown in the drawing may comprise a self lapping brake valve device 1 which is adapted to be controlled from the front end of a vehicle to normally control the brakes and a brake valve device 2 which is not self lapping and which is arranged at the rear end of the vehicle. This latter brake valve device is for use in controlling the brakes when backing the vehicle.

The equipment may also comprise a brake cylinder 3, a double check valve device 4 and a main reservoir 5.

The brake valve device 1 is preferably of the type comprising a casing containing a piston 6, subject on one side to the pressure of a spring 7 and provided at the other side with a crosshead 8 adapted to operate a supply valve 9 and a release valve 10 for respectively controlling the admission of fluid under pressure to, and the release of fluid under pressure from, a straight air pipe 11. The compression of the spring 7 is varied by means of a movable spring engaging plunger 12 which is operatively connected to one end of an operating lever 13 fulcrumed intermediate its ends to the casing.

For operating the lever 13 and thereby controlling the operation of the brake valve device 1, a mechanism is provided which may comprise a foot pedal 14 which is arranged at the front end of the vehicle where it is adapted to be engaged by a foot of the operator. Intermediate its ends this pedal is rockably mounted on a pin 15 which is mounted above the vehicle floor 16 in spaced lugs 17 formed on a bracket member 18 secured to the floor.

This foot pedal is provided on each side with a projection 50 which is received in a curved groove 51 formed in each of the lugs 17, the upper end of each groove being open to permit the application and removal of the foot pedal from the bracket member. Due to this construction, the foot pedal can only be removed from or applied to the pedal bracket when the pedal is in full service position.

The bracket member 18 is provided with a downwardly depending portion 19 which extends through an opening in the floor 16 and in which a short shaft 20 is journalled, the ends of the shaft projecting beyond the sides of the portion 19. Secured to one end of the shaft 20 is an arm 21 which is operatively connected to the lower end of a link 22 by a pin or bolt 23, the upper end of the link being operatively connected to a lug 24 integral with and depending downwardly from the forward end of the foot pedal 14 by a pin 25 which is secured to the lug 24. The pin 25 extends through the lug 24 and on one end thereof, the upper end of the link 22 is mounted, the pin being received in an opening 26 formed in the link.

Secured to the other end of the shaft 20 is an arm 27 which is operatively connected to the lever 13 by a rod 28.

Mounted in the bracket member 18 is a plunger 29 which is subject at all times, to the pressure of a coil spring 30 for maintaining the pin in engagement with the link 22. By reason of this engagement, the link will be maintained in position against accidental sidewise movement from the pin 25.

The link 22 at any desirable location intermediate its ends, is provided with a notch 31, which, when the pedal is operated to a predetermined brake applying position, will receive the outer end of the plunger 29 which is forced outwardly into the notch by the pressure of the spring 30 when the notch is brought in line with the plunger as will be hereinafter more fully described.

Adjacent its upper end the link 22 is provided with a stop 32 which is adapted to engage the bracket member 18 to limit the downward movement of the link and therefore limit the movement of the several parts of the mechanism associated with the link.

The brake valve device 2 may comprise a casing having a chamber 33 constantly connected to the main reservoir 5 through a main reservoir passage and pipe 34 and containing a rotary valve 35 having a stem 36 which is adapted to be operated by the usual removable handle (not shown). As shown in Fig. 1, the upper portion of the casing is so formed that the operating handle can be removed only in a brake applying position.

The double check valve device 4 is interposed in the straight air pipe 11 between the brake valve devices 1 and 2 and the brake cylinder 3 and may comprise a casing containing connected check valves 37 and 38. The chamber 39 at one side of the check valve 37 is connected to that portion of the pipe 11 connected to the brake valve device 1 and the chamber 40 at one side of the check valve 38 is connected to the portion of the pipe connected to the brake valve device 2. The chamber 41 intermediate the check valves is connected to the brake cylinder 3 through a passage and pipe 42.

With the equipment in release position as shown in Fig. 1 of the drawing, the spring 7 of the brake valve device 1 is fully expanded and does not exert downward pressure on the piston 6, so that the pressure of a spring 43 will maintain the piston and crosshead 8 in their upper positions in which the release valve 10 is maintained unseated by the cross head and the supply valve 9 is maintained seated by the pressure of a spring 44. With the release valve 10 unseated, the brake cylinder 3 is connected to the atmosphere by way of pipe and passage 42, chamber 41 in the double check valve device 4, past the unseated check valve 37, through chamber 39, pipe 11, a chamber 45 in the brake valve device 1, past the unseated release valve 10 and through a passage 46.

Further, with the equipment in release position, the brake valve device 2 at the rear end of the car is in application position and the operating handle is removed therefrom. With the brake valve device 2 in this position, fluid under pressure supplied to the chamber 33 from the main reservoir 5 through pipe and passage 34, flows to the chamber 40 in the double check valve device 4 through a port 47 in the rotary valve 35 and passage and pipe 11 and maintains the check valve 38 seated, closing communication between that portion of the pipe 11 which is connected to the brake valve device 2 and the brake cylinder 3. With the check valve 38 seated, the check valve 39 is maintained unseated, establishing communication between the brake cylinder 3 and that portion of the pipe 11 which is connected to the brake valve device 1.

To effect an application of the brakes, the operator, by the toe or forward portion of one of his feet, rocks the foot pedal 14 in a counter-clockwise direction about the fulcrum pin 15, causing the link 22 to be moved downwardly. As the link 22 is thus moved, it causes the arm 21, shaft 20 and arm 27 to be rotated in a counter-clockwise direction. As the arm 27 is thus moved, it pulls the rod 28 forwardly, causing the lever 13 of the brake valve device 1 to be rotated about its fulcrum in a clockwise direction. Since the fulcrum for the lever 13 is located intermediate the ends of the lever, the plunger 12 will be forced downwardly compressing the spring 7. The pressure of the spring 7 now causes the piston 6 and crosshead 8 to move downwardly against the pressure of the spring 43, seating the release valve 10 and unseating the supply valve 9 against the pressure of the spring 44.

With the supply valve 9 thus unseated, fluid under pressure from the main reservoir pipe 34 flows to the brake cylinder 3 through chamber 45 in the brake valve device 1, pipe 11, chamber 39 in the double check valve device 4, past the unseated check valve 37, through chamber 41 and passage and pipe 42.

Should it be desired to effect a full service application of the brakes, the operator rocks the foot pedal in a counter-clockwise direction until the stop 32 on the link 22 engages the top surface of the bracket member 18 when the spring 7 will be fully compressed, maintaining the supply valve 9 unseated. As the link 22 is being moved downwardly in effecting a full service application of the brakes, the plunger 29 will be projected into the notch 31 in the link and will offer resistance to the further downward movement of the link which is readily overcome by the operator increasing his foot pressure on the forward portion of the foot pedal.

When the stop 21 of the link 22 engages the bracket member 21, the plunger 29 will engage the pin 25 and will be in horizontal alignment therewith as shown in Fig. 5 and will have a tendency to move the pin 25 toward the left hand out of engagement with the link 22, but it will be understood that the pin 25 is tightly secured to the lug 24 by a driving fit or otherwise, so that it cannot be moved by the plunger.

When the mechanism is in full service position, as shown in Figs. 3 and 5, the axis of a pin 49, which operatively connects one end of the rod 28 to the arm 27, will be slightly below the axis of the shaft 20, so that the pressure of the spring 7, acting through the plunger 12, lever 13 and rod 28, will have a tendency to further rotate the arm in a counter-clockwise direction, which tendency is resisted by the lug 32 on the link 22 engaging the bracket member, thus effectively maintaining the mechanism and brake valve device 2 in full service position.

To partially release the brakes, the operator initially exerts heel pressure on the rear or heel portion of the foot pedal 14, causing the pedal to be rocked in a clockwise direction. As the pedal is thus operated, the link 22 is drawn upwardly, rotating the arms 21 and 27 and the shaft 20 in a clockwise direction, and when the connection between the arm 27 and pin 49 has been moved to such a position that the axis of the pin is slightly above the axis of the shaft 20, the pressure of the spring 7 will act to automatically return the mechanism toward full release position. Now, when the notch 31 in the link 22 is opposite the end of the plunger 29, the pressure of the spring 30 will project the plunger outwardly into the notch and will arrest the upward movement of the link and consequently maintain the spring 7 compressed sufficiently to insure a brake cylinder pressure of 15 or 20 pounds or any other predetermined low pressure to maintain the brakes applied with sufficient force to hold the vehicle at a stop.

To operate the mechanism from this intermediate application position to full release position, the operator again exerts heel pressure on the rear or heel portion of the foot pedal, causing the pedal to operate to pull the link 22 upwardly against the resistance offered by the plunger 29 engaging the link 22 within the notch 31 and when the plunger rides out of the notch 31, the pressure of the spring 7 will return the mechanism to full release position as shown in Fig. 1.

If, when the plunger 29 is in engagement with the link 22 within the notch 31, it is desired to increase the brake cylinder pressure, the operator exerts pressure on the forward or toe portion of the foot pedal, causing the link to move downwardly. As the link is so moved it causes the plunger to ride out of the notch 31.

In effecting a limited application of the brakes, i. e., an application short of a full service application, the pressure of fluid in chamber 45 in the brake valve device 1, when such pressure is slightly greater than the adjusted pressure of the spring 7, causes the piston 6 to move upwardly until the supply valve 9 is seated, at which time the upward movement of the piston ceases. This upward movement of the piston will not be sufficient to unseat the release valve 10, so that the desired brake cylinder pressure will be maintained. It will thus be seen that the brake valve device is automatically lapped.

When it is desired to remove the foot pedal, as in changing ends or for any other reason, the operator operates the mechanism to full service position in which it will be maintained as before described. With the mechanism in this position, the foot pedal 14 is in a substantially horizontal position and the lugs 50 thereon are at the open ends of the grooves 51. The operator now lifts the pedal from the pin 15 and bracket member 18 and in so doing rotates the pedal about the pin 25. When the pedal is entirely free of the bracket member, a sidewise movement of the pedal withdraws the end of the pin 25 from the opening 26 in the link 22. As before stated, when the mechanism is in full service position, the pin 25 and plunger 29 are in axial alignment so that when the pin 25 is withdrawn from the opening 26 the spring acts to project the plunger into the opening, thus positively locking the mechanism in full service position. When the pedal is again applied, the insertion of the pin 25 in the opening 26 will cause the plunger to be moved to unlocking position.

If when the brake valve device is locked in full service position as just described it is desired to back the vehicle, the operator inserts a brake valve handle in the brake valve device 2 and moves the rotary valve 35 to release position shown in Fig. 8, in which position, fluid under pressure in the chamber 40 in the double check valve device 4 is discharged to the atmosphere through pipe and passage 11, a cavity 52 in the rotary valve 35 and a passage 53. With the chamber 40 thus vented and the chambers 39 and 41 in the check valve device supplied with fluid under pressure through the brake valve device 1, the check valves are shifted to their right hand positions in which the check valve 39 is seated and the check valve 38 unseated. With the check valve 38 unseated, communication is established through which fluid under pressure is discharged from the brake cylinder to the atmosphere by way of the brake valve device 2. So long as the brake valve device 1 is in full service position, the check valves will remain in their right hand positions and consequently, the application and release of the brakes may be controlled by means of the brake valve device 2.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a control mechanism, the combination with a fixed bracket, a shaft rotatably carried by said bracket, an arm secured to said shaft operable to rotate said shaft, a pedal for operating said arm, said pedal being rockably mounted on said bracket and operatively connected to said arm, another arm secured to said shaft and adapted to be operated thereby, a rod operatively connected to said arm and to means adapted to be controlled, said arms, shaft and rod being operable to a predetermined control position upon the rocking of said pedal in one direction, and yieldable resistance means opposing the operation of the mechanism, the axis of the connection between said other arm and the rod being moved past the axis of the shaft in the operation of the mechanism to said predetermined control position for holding the mechanism in said predetermined position against the opposing force of said yieldable resistance means.

2. In a control mechanism, the combination with a fixed bracket, a shaft rotatably carried by said bracket an arm secured to said shaft operable to rotate said shaft, a pedal for operating said arm, said pedal being rockably mounted on said bracket and operatively connected to said arm, another arm secured to said shaft and adapted to be operated thereby, a rod operatively connected to said arm and to means adapted to be controlled, said arms, shaft and rod being operable to a predetermined control position upon the rocking of said pedal in one direction, yieldable resistance means opposing the operation of the mechanism, the axis of the connection between said other arm and the rod being moved past the axis of the shaft in the operation of the mechanism to said predetermined control position for holding the mechanism in said predetermined position against the opposing force of said yieldable resistance means, and means operable to positively lock said mechanism in said predetermined control position.

3. In a control mechanism, the combination with a fixed bracket, a shaft rotatably carried by said bracket, an arm secured to said shaft operable to rotate said shaft, a pedal for operating said arm, said pedal being rockably mounted on said bracket and operatively connected to said arm, another arm secured to said shaft and adapted to be operated thereby, a rod operatively connected to said arm and to means adapted to be controlled, said arms, shaft and rod being operable to a predetermined control position upon the rocking of said pedal in one direction, yieldable resistance means opposing the operation of the mechanism, the axis of the connection between said other arm and the rod being moved past the axis of the shaft in the operation of the mechanism to said predetermined control position for holding the mechanism in said predetermined position against the opposing force of said yieldable resistance means, and means carried by said bracket adapted to be moved into engagement with the mechanism to positively lock the mechanism in said predetermined control position.

4. In a control mechanism having a normal control position and being operable to another control position, the combination with a fixed bracket, of a control pedal rockably mounted on said bracket for operating the mechanism, said pedal being detachably connected to said bracket and mechanism, means normally locking said pedal to the bracket against detachment from the bracket and mechanism and adapted when the pedal is in said other control position to permit the detachment of the pedal from the bracket and mechanism, and means movable automatically into locking engagement with the mechanism upon the detachment of the pedal from the mechanism.

5. In a control mechanism having a normal control position and being operable to another control position, the combination with a fixed bracket, of a control pedal rockably mounted on said bracket for operating the mechanism, said pedal being detachably connected to said bracket and mechanism, means normally locking said pedal to the bracket against detachment from the bracket and mechanism and adapted when the pedal is in said other control position to permit the detachment of the pedal from the bracket and mechanism, and means carried by the bracket movable automatically into locking engagement with the mechanism upon the detachment of the pedal from the mechanism.

6. In a control mechanism having a normal control position and being operable to another control position, the combination with a fixed bracket, of a control pedal rockably mounted on said bracket for operating the mechanism, said pedal being detachably connected to said bracket and mechanism, means normally locking said pedal to the bracket against detachment from the bracket and mechanism and adapted when the pedal is in said other control position to permit the detachment of the pedal from the bracket and mechanism, and a plunger movable automatically into positive locking engagement with the mechanism upon the detachment of the pedal from the mechanism.

7. In a control mechanism having a normal control position and being operable to a plurality of other control positions, the combination with a fixed bracket, of a control pedal rockably mounted on said bracket for operating the mechanism, said pedal being detachably connected to said bracket and mechanism, means normally locking said pedal to the bracket against detachment from the mechanism and adapted when the pedal is in one of said other control positions to permit the detachment of the pedal from the bracket and mechanism, and means movable automatically into yieldable locking engagement with the mechanism when the mechanism is operated to one of said other control positions and movable automatically into positive locking engagement with the mechanism upon the detachment of the pedal from the mechanism.

8. In a control mechanism having a normal control position and being operable therefrom to a plurality of other control positions, said mechanism comprising a fixed bracket, a rotatable shaft journalled in said bracket, an arm for operating said shaft, another arm adapted to be operated by said shaft and operatively connected to an element to be controlled, a pedal for operating the first mentioned arm and thereby the shaft and said other arm from their normal control position to any of their other control positions, said pedal being detachably connected to the mechanism, means yieldably opposing movement of the mechanism from its normal control position to its other control positions, and means movable automatically into yieldable locking engagement with the mechanism when the mechanism is moved to one of said other control positions and movable automatically into positive locking engagement with the mechanism upon the detachment of the pedal from the mechanism.

9. In a control mechanism having a normal control position and being operable therefrom to a plurality of other control positions, said mechanism comprising a fixed bracket, a rotatable shaft journalled in said bracket, an arm for operating said shaft, another arm adapted to be operated by said shaft and operatively connected to an element to be controlled, a link for operating the first mentioned arm, a pedal rockably mounted on said bracket for operating said link, said pedal being removable from the bracket, a projection on said pedal operatively engaging the link and movable out of engagement with the link when the pedal has been removed from the bracket, means for yieldably resisting movement of the mechanism toward said other control positions, and means operable automatically into positive locking engagement with said link upon the movement of said projection out of engagement with the link.

10. In a control mechanism having a normal control position and being operable therefrom to a plurality of other control positions, said mechanism comprising a fixed bracket, a rotatable shaft journalled in said bracket, an arm for operating said shaft, another arm adapted to be operated by said shaft and operatively connected to an element to be controlled, a link for operating the first mentioned arm, a pedal rockably mounted on said bracket for operating said link, said pedal being removable from the bracket only when the mechanism is in one of said other control positions, a projection on said pedal operatively connecting the pedal to the link and movable out of engagement with the link after the pedal has been removed from the bracket, means for yieldably resisting movement of the mechanism from the normal control position to any of said other control positions, means operable into yielding locking engagement with said link when the mechanism is moved to one of said other control positions and operable into positive locking engagement with said link upon the withdrawal of said projection from the link in detaching the pedal from the mechanism.

JOSEPH M. DAPRON.